US008611476B1

(12) United States Patent  
Nabar et al.

(10) Patent No.: US 8,611,476 B1  
(45) Date of Patent: *Dec. 17, 2013

(54) PHASE-ADJUSTED CHANNEL ESTIMATION FOR FREQUENCY DIVISION MULTIPLEXED CHANNELS

(71) Applicant: Marvell International Ltd., Hamilton (BM)

(72) Inventors: Rohit U. Nabar, Sunnyvale, CA (US); Kedar Shirali, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/706,164

(22) Filed: Dec. 5, 2012

Related U.S. Application Data

(63) Continuation of application No. 13/236,036, filed on Sep. 19, 2011, now Pat. No. 8,331,502, which is a continuation of application No. 11/483,057, filed on Jul. 6, 2006, now Pat. No. 8,040,982.

(60) Provisional application No. 60/727,815, filed on Oct. 18, 2005, provisional application No. 60/799,922, filed on May 12, 2006.

(51) Int. Cl.  
*H04L 27/06* (2006.01)

(52) U.S. Cl.  
USPC ........... 375/344; 375/260; 375/267; 375/346; 375/350; 370/203; 370/208

(58) Field of Classification Search  
USPC .......... 375/260, 267, 344–347, 350; 370/203, 370/208, 210  
See application file for complete search history.

(56) References Cited

U.S. PATENT DOCUMENTS

| | | | |
|---|---|---|---|
| 6,608,863 B1 * | 8/2003 | Onizawa et al. | 375/232 |
| 7,058,002 B1 * | 6/2006 | Kumagai et al. | 370/203 |
| 2004/0156309 A1 * | 8/2004 | Chadha et al. | 370/208 |
| 2005/0163238 A1 * | 7/2005 | Fujii | 375/260 |
| 2007/0268976 A1 | 11/2007 | Brink et al. | |
| 2009/0310722 A1 * | 12/2009 | Lewis | 375/344 |

* cited by examiner

*Primary Examiner* — Daniel Washburn  
*Assistant Examiner* — Eboni Hughes

(57) ABSTRACT

A method and apparatus for estimating a frequency response of a channel. The method includes adjusting phase components of estimates of the frequency response to provide phase-adjusted estimates; performing a smoothing operation on the phase-adjusted estimates to provide smoothed phase-adjusted estimates; and generating an output of a reverse phase adjustment, wherein the reverse phase adjustment is performed on the smoothed phase-adjusted estimates.

20 Claims, 10 Drawing Sheets

PHASE-ADJUSTED CHANNEL ESTIMATION FOR FREQUENCY DIVISION MULTIPLEXED CHANNELS

CROSS-REFERENCE TO RELATED APPLICATIONS

This present application is a continuation of U.S. application Ser. No. 13/236,036 (U.S. Pat. No. 8,331,502), filed Sep. 19, 2011, which is a continuation of U.S. application Ser. No. 11/483,057 (U.S. Pat. No. 8,040,982), filed on Jul. 6, 2006, which claims priority under 35 U.S.C. §119(e) to U.S. Provisional Application No. 60/727,815, filed Oct. 18, 2005, and U.S. Provisional Application 60/799,922, filed May 12, 2006, all of which are hereby incorporated by reference herein in their entirety.

BACKGROUND OF THE INVENTION

This invention relates to channel estimation, and, more particularly, to using phase adjustment in estimating the frequency response of a frequency division multiplexed communication channel.

The concept of a digital communications channel is well known. In particular, it is known that a channel can affect the amplitude and phase of a signal carried by the channel. As a simple example, suppose a signal $\cos(\omega_0 t')$ is communicated in a channel, where $w_0$ is the angular frequency of the signal, $t'$ is the time associated with the transmission of the signal, and $t'=0$ represents the beginning of the transmission. Ideally, the signal that arrives at a receiver should have the same amplitude and phase; i.e., the received signal should be $\cos(\omega_0 t)$, where $t$ is the time associated with receiving the signal, and $t=0$ represents the beginning of the reception. The time $t=0$ may correspond to $t'=\tau$, for some transmission delay $\tau$. However, the received signal is seldom the same as the transmitted signal, even in a noiseless environment. Rather, (in the absence of noise) a receiver will more likely receive a signal $A \cos(\omega_0 t+\phi)$, where $A$ is a real number that shows the channel's effect on the amplitude of the signal, and $\phi$ is a real number that shows the channel's effect on the phase of the signal. The quantity $\phi$ is commonly referred to as "initial phase."

Although the example above shows a transmission signal that has only one frequency component $\omega=\omega_0$, a signal may include more than one frequency component. Additionally, a channel may affect each frequency component differently. Accordingly, the amplitude $A$ and the initial phase $\phi$ in the example above may only apply to frequency component $\omega=\omega_0$. From this point on, when a signal includes more than one frequency component, the amplitude and initial phase for each frequency component $\omega=\omega_i$ will be denoted with a corresponding subscript i.

A fundamental concept of digital communications is that amplitude and initial phase can be represented by a coordinate in a Cartesian plane. For example, an amplitude A and an initial phase $\phi$ can be represented by the coordinate (x,y) where $X=A\cos(\phi)$ and $y=A\sin(\phi)$. Conversely, given a coordinate (x,y), an amplitude and initial phase can be computed by $$A = \sqrt{x^2 + y^2} \text{ and } \phi = \arctan\left(\frac{y}{x}\right).$$

Another fundamental concept is that a coordinate (x,y) can also correspond to a complex number of the form (x+jy), where j is the imaginary unit. In this case, the x-axis represents the real part of a complex number, and the y-axis represents the imaginary part of a complex number. The benefits of representing amplitude and initial phase graphically as a coordinate point and mathematically as a complex number are that these representations allow changes in amplitude and initial phase to be easily illustrated and computed. The next paragraph shows an example of computing a channel's effects on a signal's amplitude and initial phase. In particular, an important computation involves Euler's formula, which states that a complex number (x+jy) can equivalently be expressed as $Ae^{j\phi}$, where, as shown above, $$A = \sqrt{x^2 + y^2} \text{ and } \phi = \arctan\left(\frac{y}{x}\right).$$

As an example, suppose a transmitted signal in a channel has frequency components of the form $A_i \cos(\omega_i t+\phi_i)$. In the absence of noise, the channel will generally alter the amplitude multiplicatively by a factor $K_i$, and alter the initial phase additively by a factor $\theta_i$, resulting in a received frequency component of the form $K_i A_i \cos(\omega_i t+\phi_i+\theta_i)$. Representing these amplitudes and initial phases mathematically, the amplitude and initial phase of the transmitted frequency components can be characterized by $A_i e^{j\phi_i}$, and those of the received frequency component can be characterized by $K_i A_i e^{j(\phi_i+\theta_i)}=A_i e^{j\theta_i}$. This shows two important things. First, it can be seen that the channel's effect on the amplitude and initial phase of the transmitted frequency component is captured by the term $K_i e^{j\theta_i}$. Second, if (in the absence of noise) the amplitude and initial phase of a received frequency component is $B_i e^{j\phi_i}$, then the channel's effect on the transmitted amplitude and initial phase can be computed by $$K_i e^{j\theta_i} = \frac{B_i e^{j\varphi_i}}{A_i e^{j\phi_i}} = \frac{B_i}{A_i} e^{j(\varphi_i-\phi_i)}; \text{ i.e., } K_i = \frac{B_i}{A_i} \text{ and } \theta_i = \varphi_i - \phi_i.$$

When all of the effects $K_i e^{j\theta_i}$ across a continuous frequency range are quantified, the result is a function showing a channel's effect on signal amplitude and initial phase based on frequency. The function is referred to in the art as a "transfer function." A graph of a transfer function with respect to frequency is referred to as the channel's "frequency response."

The examples above assume an absence of noise in or affecting the channel. As mentioned above, a signal's frequency component can have amplitude and initial phase that are represented by a complex number $s_i$, and the channel's frequency response for the frequency component can be represented by a complex number $h_i$. In the absence of noise, the received frequency component has amplitude and initial phase given by $y_i=h_i \cdot s_i$. However, a channel's frequency response can vary over time. Therefore, the value of $h_i$ may need to be re-evaluated. One way in which this can be accomplished is by sending the receiver a "training signal," which is a predetermined signal that is known by the receiver. The training signal can include a frequency component that has predetermined amplitude and initial phase given by $s_i$. When the training signal arrives at the receiver with amplitude and initial phase $y_i$, the receiver can evaluate the channel's frequency response for the frequency component by computing $$h_i = \frac{y_i}{s_i}.$$

However, when noise is present, the channel's frequency response becomes more difficult to estimate. As used herein, the term "noise" refers to phenomena or effects, in or affecting a channel, that affect a signal carried on the channel and that are not already included by the channel's frequency response. Generally, when noise is present, the received frequency component becomes $y_i = h_i \cdot s_i + n_i$. In this situation, both $h_i$ and $n_i$ may vary over time, and it becomes more difficult to estimate the frequency response $h_i$ with certainty based on knowing only the training component $s_i$ and the received component $y_i$.

Ultimately, the desired operation of a receiver is to correctly detect a transmitted signal. To do so, a receiver can benefit from having a more accurate estimate of the channel's frequency response. Additionally, a channel estimate is useful for many kinds of operations, such as equalization. However, the presence of noise undermines the receiver's ability to produce an accurate channel estimate. Accordingly, there is continued interest in improving a receiver's channel estimation capabilities.

SUMMARY OF THE INVENTION

The disclosed technology provides an apparatus and method for estimating the frequency response of a frequency division multiplexed (FDM) channel that includes sub-channels.

In accordance with one aspect of the invention, the disclosed technology can compute initial estimates of the frequency response of the sub-channels based on a received signal and a predetermined training signal, wherein the received signal corresponds to the predetermined signal and wherein the initial estimates include phase components, adjust the phase components of the initial estimates to provide phase-adjusted estimates, perform a smoothing operation on the phase-adjusted estimates to provide smoothed estimates, and perform a reverse phase adjustment on the smoothed estimates to provide final estimates of the frequency response of the sub-channels.

In one aspect of the invention, for each of the sub-channels, the disclosed technology can compute the initial estimate for the sub-channel based on portions of the received signal and the predetermined signal that correspond to the sub-channel.

In one aspect of the invention, for each of at least one of the sub-channels, the disclosed technology can adjust the phase components of the initial estimates by computing a phase difference between the phase component of the initial estimate for the sub-channel and the phase component of the initial estimate for an adjacent sub-channel. The disclosed technology can compute a mean phase difference based on the phase differences and can adjust the phase components of the initial estimates based on the mean phase difference to provide the phase-adjusted estimates.

In one embodiment, the sub-channels include at least a first sub-channel that corresponds to a first frequency and a second sub-channel that corresponds to a second frequency. The disclosed technology can adjust the phase components of the initial estimates based on the mean phase difference by adjusting the phase component of the initial estimate for the first sub-channel by a first multiple of the mean phase difference, and adjusting the phase component of the initial estimate for the second sub-channel by a second multiple of the mean phase difference. In one embodiment, the first multiple is greater than the second multiple if the first frequency is greater than the second frequency, and the first multiple is less than the second multiple if the first frequency is less than the second frequency. In one embodiment, the first multiple differs from the second multiple by an amount that is proportional to a difference between the first and second frequency values.

In one aspect of the invention, for each sub-channel, the disclosed technology can adjust a phase component of the smoothed estimate by an amount that is substantially the opposite of the amount of phase adjustment to the initial estimate for the sub-channel.

In one aspect of the invention, for each of the sub-channels, the disclosed technology can compute the smoothed estimate for the sub-channel based on the phase-adjusted estimate for the sub-channel and at least the phase-adjusted estimate for an adjacent sub-channel. In one embodiment, the disclosed technology can compute an average of the phase-adjusted estimate for the sub-channel and the phase-adjusted estimates for a particular number of neighboring sub-channel.

In one aspect of the invention, the disclosed technology can access an indicator that has an on-value and at least one other value. The phase adjustment operation, the smoothing operation, and the reverse phase adjustment are performed only when the indicator has the on-value.

In accordance with one aspect of the invention, a receiver can include means for computing initial estimates of the frequency response of sub-channels in a FDM channel based on a received signal and a predetermined training signal, wherein the received signal corresponds to the predetermined signal and wherein the initial estimates include phase components, means for adjusting the phase components of the initial estimates to provide phase-adjusted estimates, means for performing a smoothing operation on the phase-adjusted estimates to provide smoothed estimates, and means for performing a reverse phase adjustment on the smoothed estimates to provide final estimates of the frequency response of the sub-channels.

In one aspect of the invention, for each of the sub-channels, the receiver can include means for computing the initial estimate for the sub-channel based on portions of the received signal and the predetermined signal that correspond to the sub-channel.

In one aspect of the invention, for each of at least one of the sub-channels, the receiver can include means for adjusting the phase components of the initial estimates by computing a phase difference between the phase component of the initial estimate for the sub-channel and the phase component of the initial estimate for an adjacent sub-channel, means for computing a mean phase difference based on the phase differences, and means for adjusting the phase components of the initial estimates based on the mean phase difference to provide the phase-adjusted estimates.

In one embodiment, the sub-channels include at least a first sub-channel that corresponds to a first frequency and a second sub-channel that corresponds to a second frequency. The receiver can include means for adjusting the phase components of the initial estimates based on the mean phase difference, which can include means for adjusting the phase component of the initial estimate for the first sub-channel by a first multiple of the mean phase difference, and means for adjusting the phase component of the initial estimate for the second sub-channel by a second multiple of the mean phase difference. In one embodiment, the first multiple is greater than the second multiple if the first frequency is greater than the second frequency, and the first multiple is less than the second multiple if the first frequency is less than the second frequency. In one embodiment, the first multiple differs from the second multiple by an amount that is proportional to a difference between the first and second frequency values.

In one aspect of the invention, for each sub-channel, the receiver can include means for adjusting a phase component of the smoothed estimate by an amount that is substantially the opposite of the amount of phase adjustment to the initial estimate for the sub-channel.

In one aspect of the invention, for each of the sub-channels, the receiver can include means for computing the smoothed estimate for the sub-channel based on the phase-adjusted estimate for the sub-channel and at least the phase-adjusted estimate for an adjacent sub-channel. In one embodiment, the receiver can include means for computing an average of the phase-adjusted estimate for the sub-channel and the phase-adjusted estimates for a particular number of neighboring sub-channel.

In one aspect of the invention, the receiver can include means for accessing an indicator that has an on-value and at least one other value. In one embodiment, the phase adjustment means, the smoothing operation means, and the reverse phase adjustment means can perform their operations only when the indicator has the on-value.

In accordance with one aspect of the invention, the receiver can include a computer program running on a processor that computes initial estimates of the frequency response of sub-channels in a FDM channel based on a received signal and a predetermined training signal, wherein the received signal corresponds to the predetermined signal and wherein the initial estimates include phase components, adjusts the phase components of the initial estimates to provide phase-adjusted estimates, performs a smoothing operation on the phase-adjusted estimates to provide smoothed estimates, and performs a reverse phase adjustment on the smoothed estimates to provide final estimates of the frequency response of the sub-channels.

In one aspect of the invention, for each of the sub-channels, a computer program running on a processor can compute the initial estimate for the sub-channel based on portions of the received signal and the predetermined signal that correspond to the sub-channel.

In one aspect of the invention, for each of at least one of the sub-channels, a computer program running on a processor can adjust the phase components of the initial estimates by computing a phase difference between the phase component of the initial estimate for the sub-channel and the phase component of the initial estimate for an adjacent sub-channel. A computer program running on a processor can compute a mean phase difference based on the phase differences and can adjust the phase components of the initial estimates based on the mean phase difference to provide the phase-adjusted estimates.

In one embodiment, the sub-channels include at least a first sub-channel that corresponds to a first frequency and a second sub-channel that corresponds to a second frequency. A computer program running on a processor can adjust the phase components of the initial estimates based on the mean phase difference by adjusting the phase component of the initial estimate for the first sub-channel by a first multiple of the mean phase difference, and adjusting the phase component of the initial estimate for the second sub-channel by a second multiple of the mean phase difference. In one embodiment, the first multiple is greater than the second multiple if the first frequency is greater than the second frequency, and the first multiple is less than the second multiple if the first frequency is less than the second frequency. In one embodiment, the first multiple differs from the second multiple by an amount that is proportional to a difference between the first and second frequency values.

In one aspect of the invention, for each sub-channel, a computer program running on a processor can adjust a phase component of the smoothed estimate by an amount that is substantially the opposite of the amount of phase adjustment to the initial estimate for the sub-channel.

In one aspect of the invention, for each of the sub-channels, a computer program running on a processor can compute the smoothed estimate for the sub-channel based on the phase-adjusted estimate for the sub-channel and at least the phase-adjusted estimate for an adjacent sub-channel. In one embodiment, a computer program running on a processor can compute an average of the phase-adjusted estimate for the sub-channel and the phase-adjusted estimates for a particular number of neighboring sub-channel.

In one aspect of the invention, a computer program running on a processor can access an indicator that has an on-value and at least one other value. The phase adjustment operation, the smoothing operation, and the reverse phase adjustment are performed only when the indicator has the on-value.

Further features of the invention, its nature and various advantages, will be more apparent from the accompanying drawings and the following detailed description of the various embodiments.

DETAILED DESCRIPTION

The disclosed technology provides a method and an apparatus for estimating the frequency response of a frequency division multiplexed (FDM) channel. As used herein, frequency division multiplexing includes orthogonal FDM. As described above herein, a frequency response describes a channel's effect on the amplitude and initial phase of frequency components in a signal. It is important to have an estimate of a channel's frequency response in digital communications because digital information is often represented by a signal's amplitude and/or phase. For example, this is the case in pulse amplitude modulation and quadrature amplitude modulation. An estimate of a channel's frequency response can allow a receiver to reverse the effects of the channel by using equalization. Ideally, after equalization, the only remaining effects distorting a frequency component is noise, and the effects of noise can be mitigated or eliminated by channel coding. From this point on, an estimate of a channel's frequency response may be referred to simply as a "channel estimate."

One use of a channel estimate is in equalization (which isolates noise), but noise is a reason why it is difficult to produce an accurate channel estimate in the first place. In relation to a channel, the conceptual difference between frequency response and noise is clear. As described above, "noise" as used herein refers to phenomena or effects that affect a signal carried on a channel and that are not already included by the channel's frequency response. Analytically, these effects can be described in the frequency domain by $Y(\omega)=H(\omega) \cdot S(\omega)+N(\omega)$, where $H(w)$ is the channel frequency response, $S(w)$ is the transmitted signal's frequency content, $Y(w)$ is the received signal's frequency content, and $N(w)$ is the noise frequency content. Given this equation, it can be seen that $H(w)$ and $N(w)$ are quite distinct mathematically. However, in practice, which effects contribute to noise and which effects contribute to frequency response may not be easily distinguishable. The characterization of various effects as contributing to noise or frequency response is not crucial, however, because, as the following description will show, noise and frequency response have different characteristics and properties, which can be used to estimate the frequency response of a channel.

Figure 1:
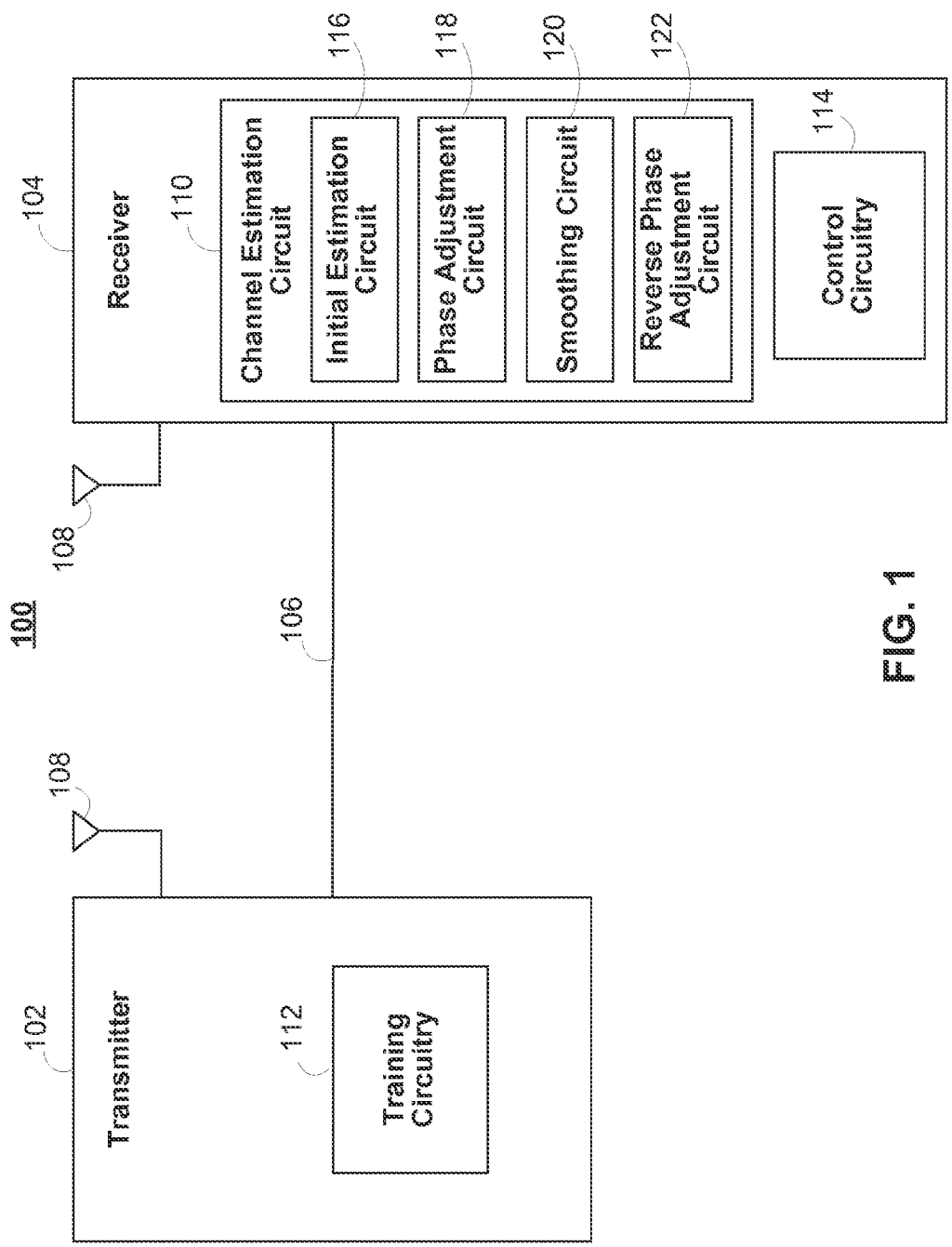
FIG. 1 is a block diagram of an exemplary communication system in accordance with aspects of the invention.

Referring now to FIG. 1, there is shown a block diagram of a communication system 100 in accordance with one aspect of the invention. The communication system 100 includes a transmitter 102 and a receiver 104, which can be in communication with each other by a physical path 106, a wireless path 108, or a combination thereof. The physical path 106 may include one or more communication media or devices (e.g., wires, cables, optical fiber, repeater devices) and, in some embodiments, may also include wireless segments (not shown). The wireless "path" 108 may not be a single path and may include multipath effects, such as fading.

In accordance with one aspect of the invention, the receiver 104 includes a channel estimation circuit 110, and the transmitter includes a corresponding training circuit 112. The training circuit 112 operates to communicate a predetermined training signal (not shown) to the channel estimation circuit 110, which also knows the predetermined training signal. The channel estimation circuit 110 receives a corresponding signal (not shown), and it is assumed that any difference between the received signal and the predetermined training signal is a result of noise and the channel's frequency response. The illustrated receiver 104 also includes a control circuit 114, which may be optional in certain embodiments. The operation of the control circuit 114 will be described later herein. Additionally, the components 116-122 of the channel estimation circuit 110 will also be described later herein.

Figure 2:
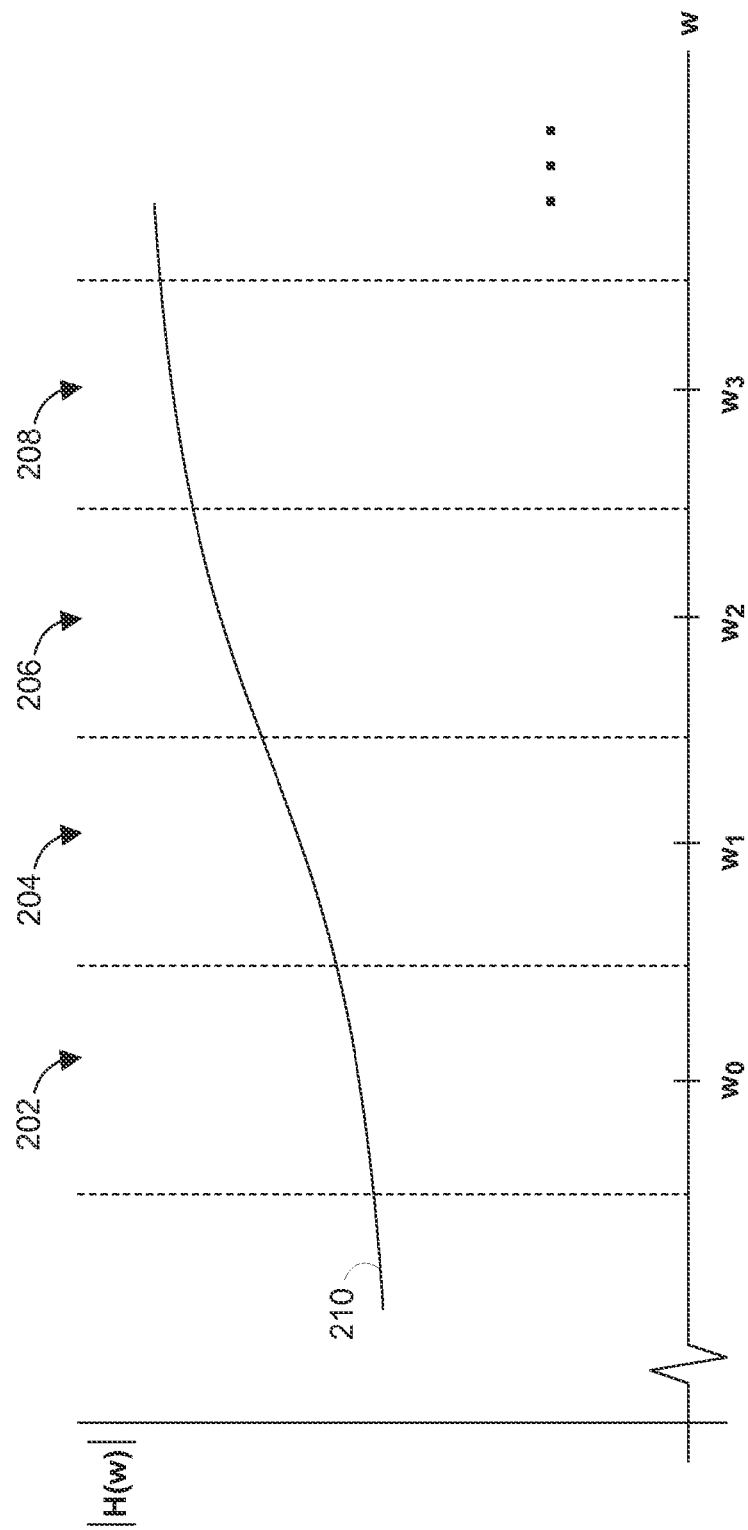
FIG. 2 is a graph of an exemplary transfer function for a frequency division multiplexed (FDM) channel applicable to the disclosed invention.

Referring now to FIG. 2, there is shown a graph of an exemplary frequency division multiplexed (FDM) channel. Those skilled in the art will recognize that a FDM channel is described in terms of frequency (f) or angular frequency (w). These terms are used interchangeably because they are related by the relationship $\omega=2\pi f$. From this point on, and for convenience, the term frequency will be used to refer to the illustrations, even though the illustrations show angular frequency. It will be understood that the discussion of frequency also applies to angular frequency.

A FDM channel is described by a frequency band of interest, which, as used herein, refers to a continuous range of frequencies on which information can be communicated. The particular frequency band used in a particular instance may depend upon industry specifications, government regulations, technological considerations, and/or economic considerations. Those skilled in the art will recognize that FDM operates to separate a frequency band of interest into sub-bands. FIG. 2 shows a portion of a frequency band of interest that includes four sub-bands 202-208. The sub-bands may also be referred to herein as "sub-channels" or "tones." Sub-channels that are next to each other will be referred to herein as being "adjacent" to each other. FIG. 2 shows that each sub-channel 202-208 includes a particular frequency $w_i$. However, those skilled in the art will recognize that each sub-channel 202-208 may also include other frequencies that are not expressly labeled. The frequencies $w_i$ and the sub-channels 202-208 may or may not be uniformly spaced. From this point on, it will be assumed that the carrier signal for each sub-channel 202-208 has the illustrated frequency $w_i$.

Figure 3:
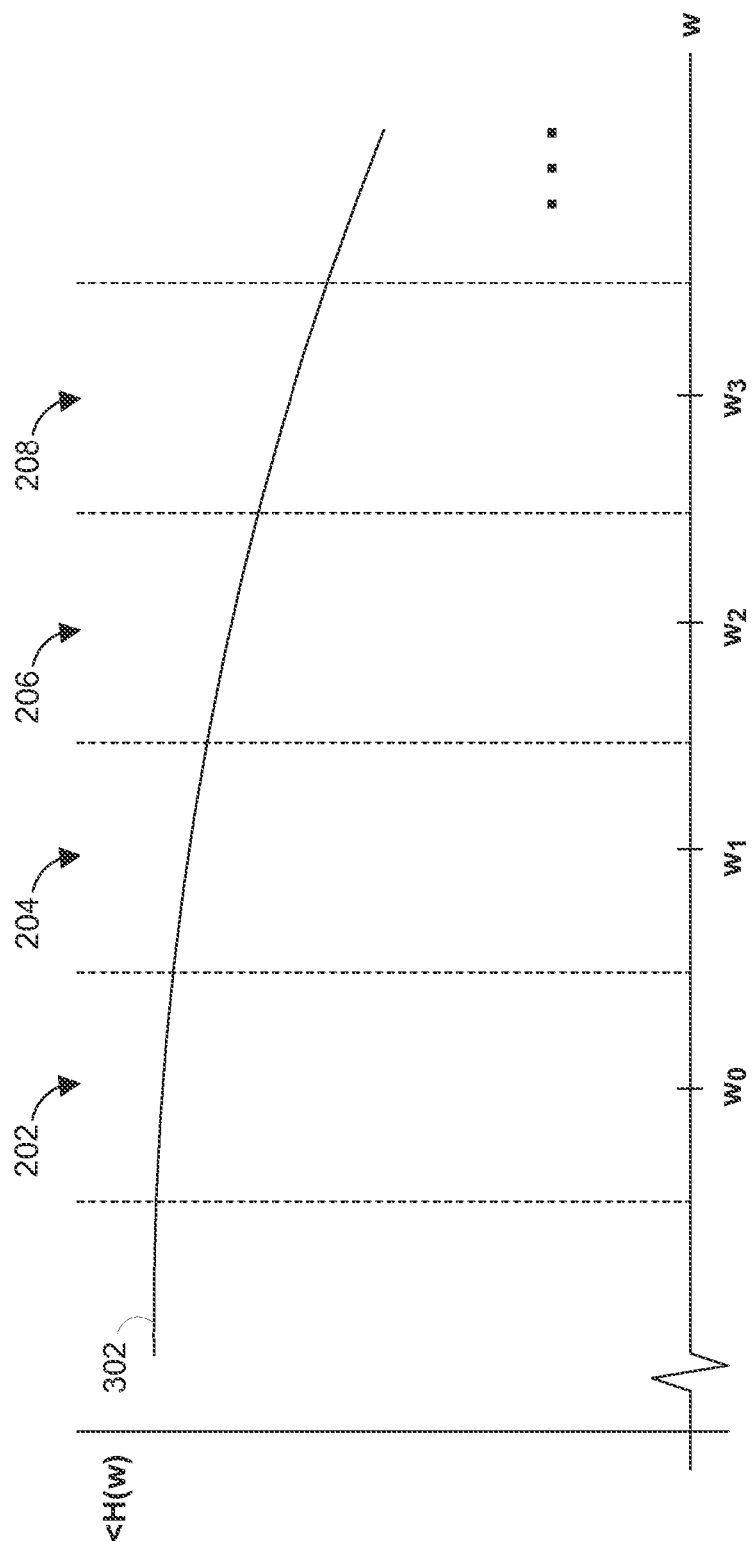
FIG. 3 is a graph of an exemplary transfer function for a FDM channel applicable to the disclosed invention.

FIG. 2 also shows a curve 210 that represents the magnitude of the channel's frequency response $|H(w)|$ with respect to frequency. This magnitude curve 210 shows the channel's amplitude effect at different frequencies. In contrast, FIG. 3 shows a curve 302 that represents the channel's phase effect for different frequencies. The terms $K_i e^{j\theta_i}$ previously used herein correspond to the magnitude and phase curves 210, 302 of FIGS. 2-3. In particular, the value of $K_i$ is related to the magnitude curve 210 at $\omega=\omega_i$, and the value of $\theta_i$ is related to the phase curve 302 at $\omega=\omega_i$. As described above, the curves 210, 302 may vary over time. Computing estimates of $K_i e^{j\theta_i}$ across different frequencies will provide estimates of particular points in the curves 210, 302. In one embodiment, some portions of the curves 210, 302 may be estimated by interpolation. For example, the portions of the curves between the frequencies $w_i$ can be computed by interpolation.

With continuing reference to FIGS. 2-3, it can be seen that the magnitude and phase curves 210, 302 are relatively smooth and gradual. One reason for the gradual progression is that the effects and phenomena that contribute to a frequency response generally affect neighboring frequencies in similar ways. For example, assuming that the frequencies $w_0$ and $w_1$ are not too far apart, an effect that contributes to the frequency response will affect signals having frequencies $w_0$ and $w_1$ in similar ways. One way to measure this similarity is by using a mathematical concept called "correlation," which measures the relationship between two quantities. Essentially, for two quantities x and y, correlation measures how closely the relationship between the quantities comes to x=y over time. If the two quantities rise and fall by exactly the same amount and at the same time, the quantities are said to be "perfectly correlated." If the quantities rise and fall by different amounts and/or with a delay, then the quantities can still be said to be correlated, but they are not perfectly correlated. In terms of correlation, it is generally the case that the amplitude effect and phase effect of adjacent sub-channels are correlated if the sub-channels are close enough to each other. From this point on, it will be assumed that the sub-channels in a FDM channel are close enough to each other to be correlated. Accordingly, referring to the illustrated sub-channels 202-208 of FIGS. 2-3, by way of example, the magnitude curve 210 and the phase curve 302 in adjacent sub-channels should vary in similar directions and by similar amounts.

In contrast, it is generally the case that noise in neighboring sub-channels is not correlated. Rather, noise in different sub-channels is generally "independent," which essentially means that there is no discernable relationship between the values of and changes in the noise in the sub-channels. However, there may be circumstances in which noise in different sub-channels are correlated, and these will be examined in more detail later herein.

Figure 4:
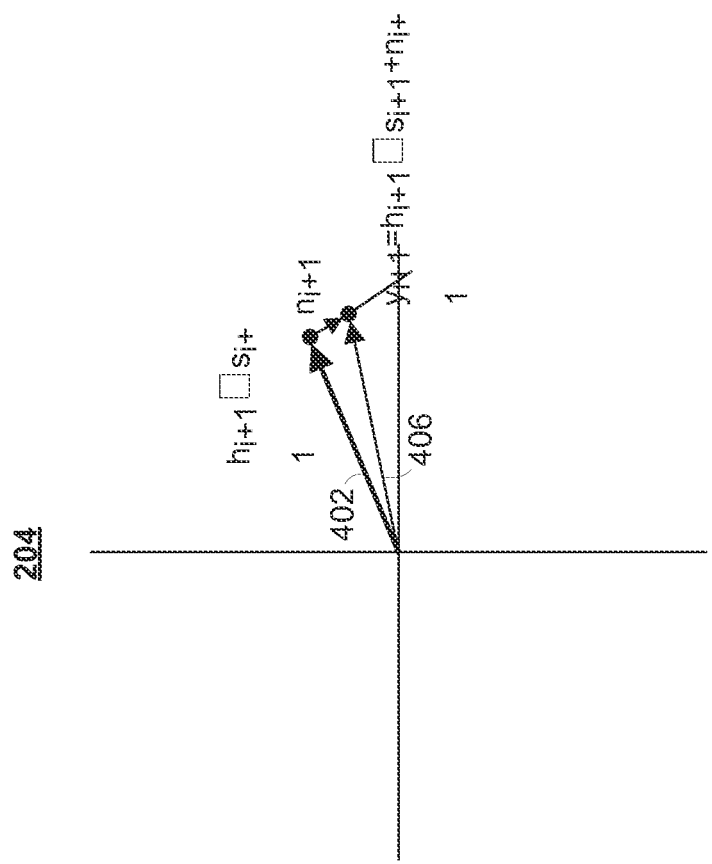
FIG. 4 is a graph of exemplary frequency components for adjacent sub-channels of a FDM channel applicable to the disclosed invention.
Figure 4:
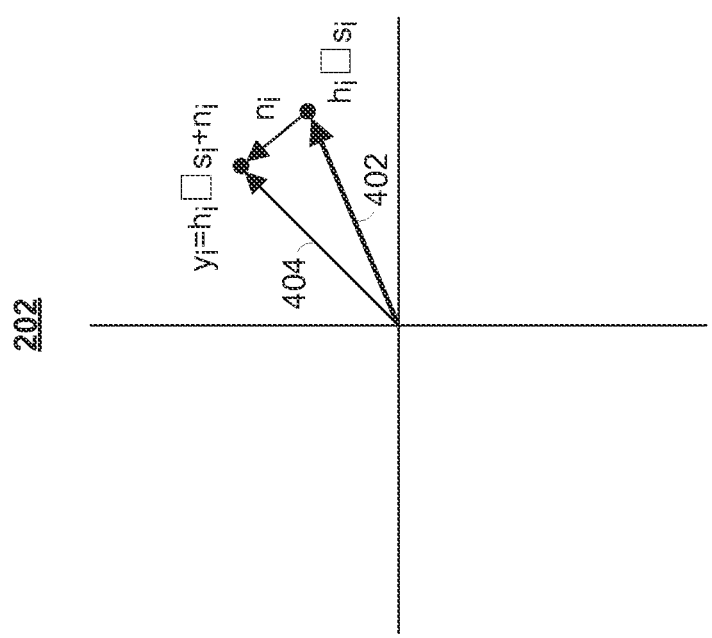

FIG. 4 illustrates one example of the frequency response effects and noise effects on a predetermined training signal with amplitude and initial phase $s_i$ for different frequency components. The illustration uses complex planes to show the amplitudes and initial phases of signals in adjacent frequencies $\omega=\omega_i$ and $\omega=\omega_{i+1}$. For example, the complex plane on the left side of FIG. 4 can correspond to the sub-channel containing $\omega=\omega_0$ in FIGS. 2-3, and the complex plane on the right side of FIG. 4 can correspond to the adjacent sub-channel containing $\omega=\omega_1$ in FIGS. 2-3. In the left sub-channel, for a frequency component with amplitude and phase $s_i$, the result of the sub-channel's effect on the signal is $h_i \cdot s_i$. In the right sub-channel, for a frequency component with amplitude and phase $s_{i+1}$, the result of the sub-channel's effect on the signal is $h_{i+1} \cdot s_{i+1}$. As mentioned above, we are assuming that the two adjacent sub-channels are correlated. Therefore, the amplitude and phase effects of the left and right sub-channels should be similar. In the illustration, it is assumed that the sub-channels are perfectly correlated. Therefore, assuming that $s_i=s_{i+1}$, then $h_i \cdot s_i=h_{i+1} \cdot s_{i+1}$ and both are represented by the vector 402. The use of vectors is a convenient way to illustrate the changes in amplitude and phase.

As described above, noise in the two sub-channels are generally independent. As an example of this independence, FIG. 4 illustrates the noise vector $n_i$ in the left sub-channel and the noise vector $n_{i+1}$ in the right sub-channel as having different magnitudes and directions. Therefore, in the illustration, the noise in the two sub-channels affects their frequency components differently. The result of the noise effect in the left sub-channel is the amplitude and phase $y_i=h_i \cdot s_i+n$, shown by vector 404, and the result of the noise effect in the right sub-channel is the amplitude and phase $y_{i+1}=h_{i+1} \cdot s_{i+1}+n_{i+1}$, shown by vector 406. It can be seen that the noise effect alone has caused the resulting vectors $y_i$ and $Y_{i+1}$ to be quite different. Therefore, the results of estimating $h_i$ based on $y_i$ alone and estimating $h_{i+1}$ based on $y_{i+1}$ alone will be different, even though they should be the same in the illustrated example.

Returning now to FIG. 1, the channel estimation circuit 110 operates to estimate the frequency response of the channel from the transmitter 102 to the receiver 104. The transmitter's training circuit 112 can send a predetermined training signal to the receiver 104, and the receiver 104 can receive a signal corresponding to the predetermined signal. The predetermined signal can have predetermined amplitudes and phases $s_i$ for frequency components $w_i$ in the sub-channels of the FDM channel. The corresponding amplitudes and phases in the frequency components of the received signal are denoted as $y_i$. The channel estimation circuit 110 includes an initial estimation circuit 116 that can compute initial estimates of the frequency response. In one embodiment, the initial estimates can be obtained by computing the result of the operations $$\hat{h}_i = \frac{y_i}{s_i}.$$

It can be seen that, analytically, $$\hat{h}_i = h_i + \frac{n_i}{s_i},$$

and the only difference between the initial estimate and the actual frequency response is due to noise.

In accordance with one aspect of the invention, the channel estimation circuit 110 makes use of the realization that the frequency response of adjacent sub-channels are correlated, but the noise effects in the sub-channels are generally less correlated or not correlated. Based on the correlation between the channel effects of adjacent sub-channels, $h_i$ and $h_{i+1}$ should be similar. Therefore, averaging the frequency responses of the adjacent sub-channels should approximate the frequency responses of the sub-channels. In contrast, based on the lesser or non-correlation of noise between sub-channels, $n_i$ and $n_{i+1}$ are likely to be different. Therefore, averaging the noise effects of the adjacent sub-channels may mitigate the noise effects. The smoothing circuit 120 operates to perform this averaging operation. In one embodiment, if the averaging operation involves two sub-channels, the operation produces $$\frac{\hat{h}_i + \hat{h}_{i+1}}{2} \approx h_i + \frac{n_i + n_{i+1}}{2s_i}. \text{ If } n_i = n_{i+1},$$

the averaging operation does not improve the initial estimate $\hat{h}_i$. At best, $n_i=-n_{i+1}$ and the noise effects cancel out, leaving $$\frac{\hat{h}_i + \hat{h}_{i+1}}{2} \approx h_i.$$

In certain circumstances, the averaging operation may exacerbate the channel estimates for certain frequencies. For example, in the case that $|n_{i+1}|>|n_i|$, the averaged estimate is actually worse than the initial estimate. Also, if arg $$\left(\frac{n_i}{s_i}\right) \approx \pm \arg(h_i),$$

the initial estimate maintains the same phase, but the averaged estimate may not. From this point on, the averaging operation will be referred to as a "smoothing" operation because the values of the resulting "smoothed" estimates are closer in value than the initial estimates. Additionally, the smoothing circuit 120 may be referred to as a "smoothing filter." The smoothing operation $$\frac{\hat{h}_i + \hat{h}_{i+1}}{2}$$

is exemplary and other, more complex smoothing operations may be used depending on the circumstances. For example, in one embodiment, the smoothing operation can perform a weighted average. In another embodiment, the noise mitigation may be improved by averaging the initial estimates of a sub-channel and both of its adjacent sub-channels. In one embodiment, the averaging may involve more than three sub-channels.

There may be circumstances where the noise between sub-channels are not independent and are correlated, and the channel effects of adjacent sub-channels are perfectly or highly correlated at least in phase. In accordance with one aspect of the invention, the phase adjustment circuit 118 may be able to identify and compensate for noise correlation by averaging the phase differences between the initial estimates of adjacent sub-channels. Specifically, as shown in FIG. 4, unless the noise effect in a sub-channel occurs in the same direction or the opposite direction as $h_i \cdot s_i$, the noise effect will adjust the phase of $h_i \cdot s_i$. If the noise effects in adjacent sub-channels are independent, the phase adjustments between the adjacent sub-channels will appear to be random so that the phase difference between the initial estimates of adjacent sub-channels will also appear to be random. Accordingly, if the noise effects in adjacent sub-channels are independent, the average of the phase differences between adjacent sub-channels should come out to be substantially zero. However, if the noise effects in the sub-channels are slightly correlated, the average of the phase differences between the initial estimates for adjacent sub-channels should come out to be non-zero.

In one embodiment, the phase adjustment circuit 118 computes the result of the operation $$\overline{\Delta \varphi} = \frac{1}{N-1} \sum_{i=0}^{N-2} \left( \arg(\hat{h}_i) - \arg(\hat{h}_{i+1}) \right),$$

where N is the number of sub-channels to average, and $\hat{h}_i$, i= 0, ..., (N−1), are the initial estimates of the frequency response of the sub-channels. The value N may be the total number of sub-channels or the number of sub-channels in a subset. If the noise effects are uncorrelated, the result $\overline{\Delta \varphi}$ will be substantially zero. Coincidentally, the result $\overline{\Delta \varphi}$ will also be substantially zero if the noise effects are perfectly correlated. When the noise effects in the sub-channels are otherwise correlated, the result $\overline{\Delta \varphi}$ will be non-zero and will represent an estimate of the direction of the noise effect in a sub-channel. In one embodiment, the phase adjustment circuit 118 can compensate the phases of the initial estimates $\hat{h}_i$ by computing the result of the operation $$\hat{g}_i = \hat{h}_i e^{j(-\overline{\Delta \varphi})}.$$

It can be seen that this operation is harmless if the noise effects are uncorrelated because the value of $\overline{\Delta \varphi}$ will be substantially zero, and there will be no change in the phase of the initial estimates. The smoothing circuit 120 can perform its smoothing operation on the phase-adjusted estimates $\hat{g}_i$, in the same manner described above, to produce smoothed phase-adjusted estimates $\hat{g}_{i,smoothed}$. In one embodiment, the smoothed phase-adjusted estimates $\hat{g}_{i,smoothed}$ are the final estimates of the frequency response of the FDM channel.

In certain circumstances, the channel effects of adjacent sub-channels may be correlated but may not be perfectly correlated. In one situation known as "phase roll," the channel's phase response may increase linearly with frequency due to, for example, timing offset at the receiver. In this situation, the amount of the phase roll can be estimated by the phase adjustment circuit 118 by computing the result of the operation $$\overline{\Delta \varphi} = \frac{1}{N-1} \sum_{i=0}^{N-2} \left( \arg(\hat{h}_i) - \arg(\hat{h}_{i+1}) \right).$$

Assuming the noise effects across different sub-channels are independent, the result $\overline{\Delta \varphi}$ should approximate the amount of the phase roll. In this situation, the phase adjustment circuit 118 can compensate the phases of the initial estimates $\hat{h}_i$ so that the phase adjustment effects of the noise can be isolated from the phase roll. The phase adjustment circuit 118 can compensate the phases of the initial estimates $\hat{h}_i$ by computing the result of the operation $$\hat{g}_i = \hat{h}_i e^{j(-i \cdot \overline{\Delta \varphi})}, \text{ for } i = 0, \ldots, (N-1).$$

The phase adjustment circuit 118 provides greater compensation at higher values of i because the phase roll increases linearly with frequency. The smoothing circuit 120 can perform its smoothing operation on the phase-adjusted estimates $\hat{g}_i$ to produce smoothed phase-adjusted estimates $\hat{g}_{i,smoothed}$. The smoothing operation may mitigate the noise effects in the sub-channels, as described above. However, in this situation, the phase-adjusted estimates $\hat{g}_{i,smoothed}$ are not the final channel estimates because the correct channel estimates should include phase roll. Accordingly, in accordance with one aspect of the invention, the reverse phase adjustment circuit 122 of the channel estimation circuit can re-introduce the phase roll back into the channel estimates by computing the result of the operation $$\hat{h}_{i,final} = \hat{g}_{i,smoothed} e^{j(+i \cdot \overline{\Delta \varphi})}.$$

The two scenarios illustrated above involve noise correlation in one scenario and phase roll in the other scenario. One difference between the phase adjustment operations in the two scenarios is in whether or not to perform the reverse phase adjustment operation at the end of the operation. In certain applications and circumstances, it may not be possible to predict which scenario is occurring. For such applications and circumstances, it may be necessary to simply assume that one particular scenario is occurring and to perform the phase adjustment operation appropriate for that particular scenario.

Figure 5:
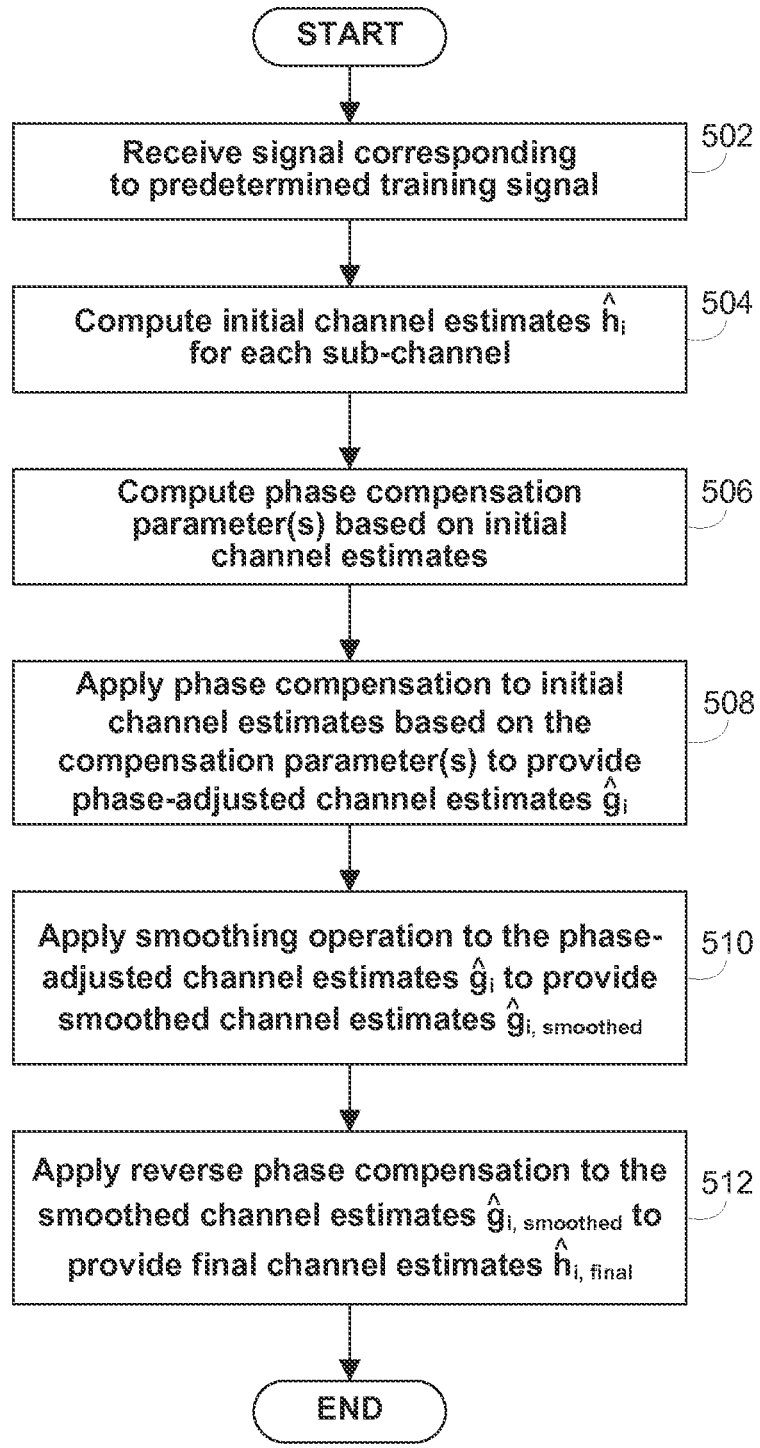
FIG. 5 is a flow diagram of an exemplary method for estimating a frequency response of an FDM channel in accordance with one aspect of the invention.

Accordingly what have been described thus far are a method and a circuit for estimating the frequency response of a frequency division multiplexed channel. FIG. 5 shows a flow diagram of one embodiment of the disclosed method. In accordance with one aspect of the invention, a transmitter can send a predetermined training signal to a receiver, which can receive a signal that corresponds to a predetermined training signal 502. A channel estimation circuit of the receiver can compute initial estimates of the frequency response of sub-channels in the FDM channel 504. The initial estimates may be inaccurate because of noise effects in the sub-channels. A phase adjustment circuit can compute a mean phase difference 506 and can adjust the phase of the initial estimates based on the mean phase difference 508. The amount of the adjustment is different depending on whether or not there is phase roll. A smoothing circuit can apply a smoothing operation to the phase-adjusted estimates 510. If it is determined that there is phase roll, a reverse phase adjustment circuit can reintroduce the phase roll back into the smoothed phase-adjusted estimates to provide final channel estimates 512.

In accordance with one aspect of the invention, the disclosed technology can be deployed in a single input single output (SISO) system, or in a multiple input multiple output (MIMO) system. In a MIMO system, the disclosed technology can be applied to paired transmitters and receivers.

In accordance with one aspect of the invention, and with reference to FIG. 1, a receiver 104 can include a control circuit 114 that controls the phase adjustment circuit 118, the smoothing circuit 120, and the reverse phase adjustment circuit 122. The transmitter 102 and the receiver 104 may have multiple modes of operation, and some modes of operation may not be amenable to a smoothing operation. For example, in modes where beam forming or cyclic delay diversity is involved or where the transmitter introduces timing offset and phase roll, the control circuit 114 can disable the phase adjustment circuit 118, the smoothing circuit 120, and the reverse phase adjustment circuit 122. In such modes, the initial estimation circuit 116 alone can provide the channel estimate.

Referring now to FIGS. 6A-6E, various exemplary implementations of the present invention are shown.

Figure 6A:
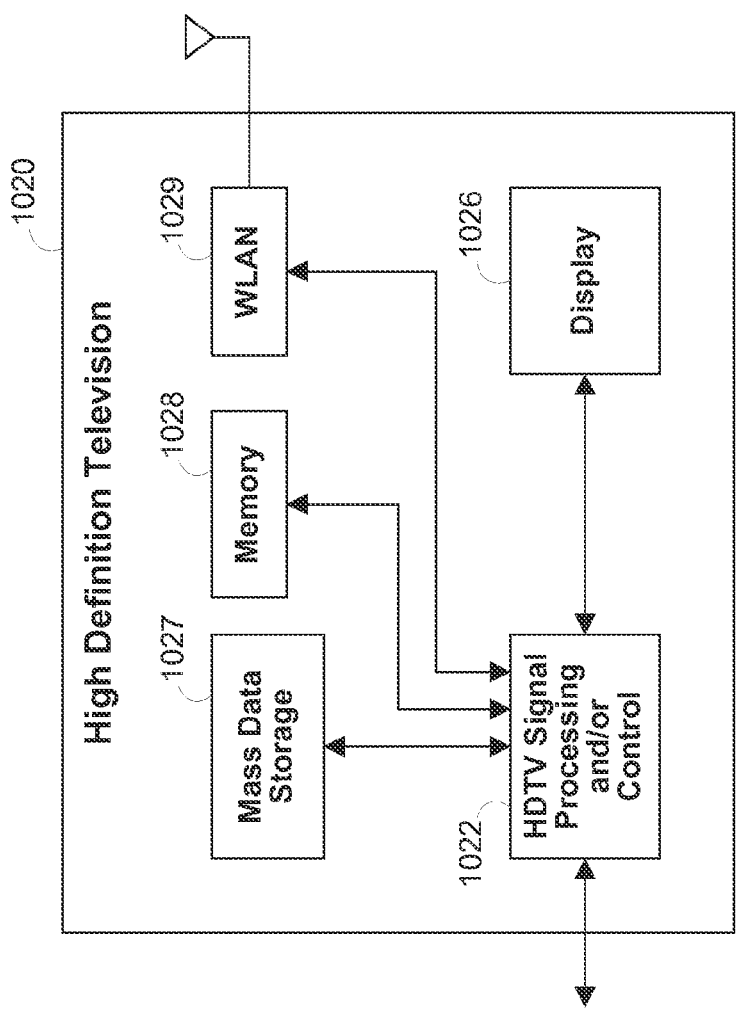
FIG. 6A is a block diagram of an exemplary high definition television that can employ the disclosed technology.

Referring now to FIG. 6A, the present invention can be implemented in a high definition television (HDTV) 1020. The present invention may implement either or both signal processing and/or control circuits, which are generally identified in FIG. 6A at 1022, a WLAN interface and/or mass data storage of the HDTV 1020. The HDTV 1020 receives HDTV input signals in either a wired or wireless format and generates HDTV output signals for a display 1026. In some implementations, signal processing circuit and/or control circuit 1022 and/or other circuits (not shown) of the HDTV 1020 may process data, perform coding and/or encryption, perform calculations, format data and/or perform any other type of HDTV processing that may be required.

The HDTV 1020 may communicate with mass data storage 1027 that stores data in a nonvolatile manner such as optical and/or magnetic storage devices. The HDD may be a mini HDD that includes one or more platters having a diameter that is smaller than approximately 1.8". The HDTV 1020 may be connected to memory 1028 such as RAM, ROM, low latency nonvolatile memory such as flash memory and/or other suitable electronic data storage. The HDTV 1020 also may support connections with a WLAN via a WLAN network interface 1029.

Figure 6B:
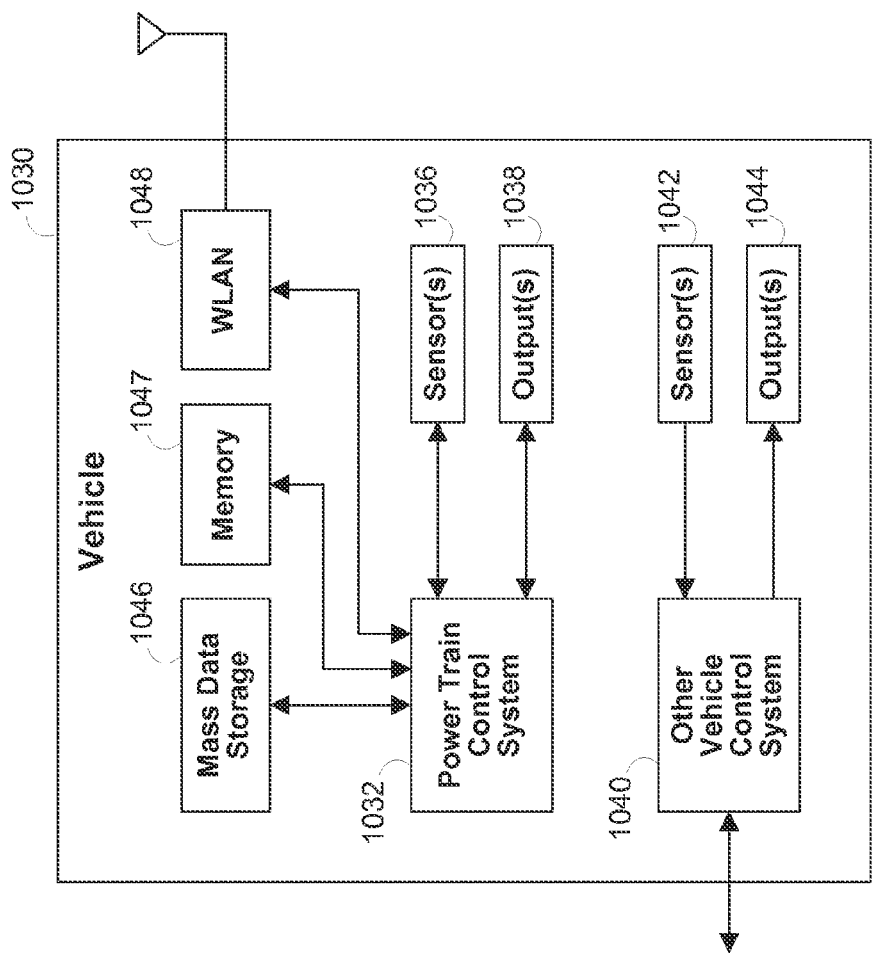
FIG. 6B is a block diagram of an exemplary vehicle that can employ the disclosed technology.

Referring now to FIG. 6B, the present invention implements a control system of a vehicle 1030, a WLAN interface and/or mass data storage of the vehicle control system. In some implementations, the present invention may implement a powertrain control system 1032 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1040 of the vehicle 1030. The control system 1040 may likewise receive signals from input sensors 1042 and/or output control signals to one or more output devices 1044. In some implementations, the control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1032 may communicate with mass data storage 1046 that stores data in a nonvolatile manner. The mass data storage 1046 may include optical and/or magnetic storage devices for example hard disk drives HDD and/or DVDs. The HDD may be a mini HDD that includes one or more platters having a diameter that is smaller than approximately 1.8". The powertrain control system 1032 may be connected to memory 1047 such as RAM, ROM, low latency nonvolatile memory such as flash memory and/or other suitable electronic data storage. The powertrain control system 1032 also may support connections with a WLAN via a WLAN network interface 1048. The control system 1040 may also include mass data storage, memory and/or a WLAN interface (all not shown).

Figure 6C:
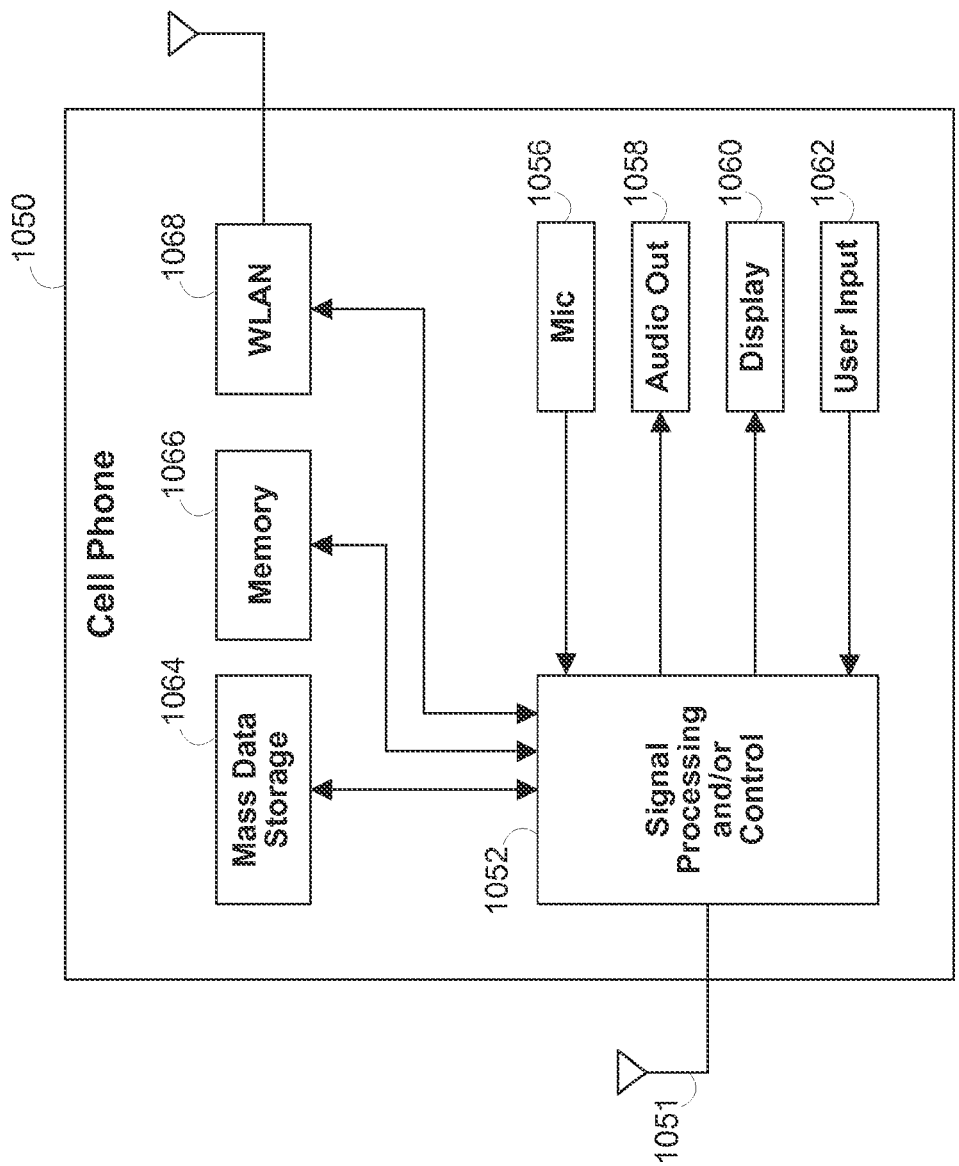
FIG. 6C is a block diagram of an exemplary cell phone that can employ the disclosed technology.

Referring now to FIG. 6C, the present invention can be implemented in a cellular phone 1050 that may include a cellular antenna 1051. The present invention may implement either or both signal processing and/or control circuits, which are generally identified in FIG. 6C at 1052, a WLAN interface and/or mass data storage of the cellular phone 1050. In some implementations, the cellular phone 1050 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular phone 1050 may process data, perform coding and/or encryption, perform calculations, format data and/or perform other cellular phone functions.

The cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 1050 may be connected to memory 1066 such as RAM, ROM, low latency nonvolatile memory such as flash memory and/or other suitable electronic data storage. The cellular phone 1050 also may support connections with a WLAN via a WLAN network interface 1068.

Figure 6D:
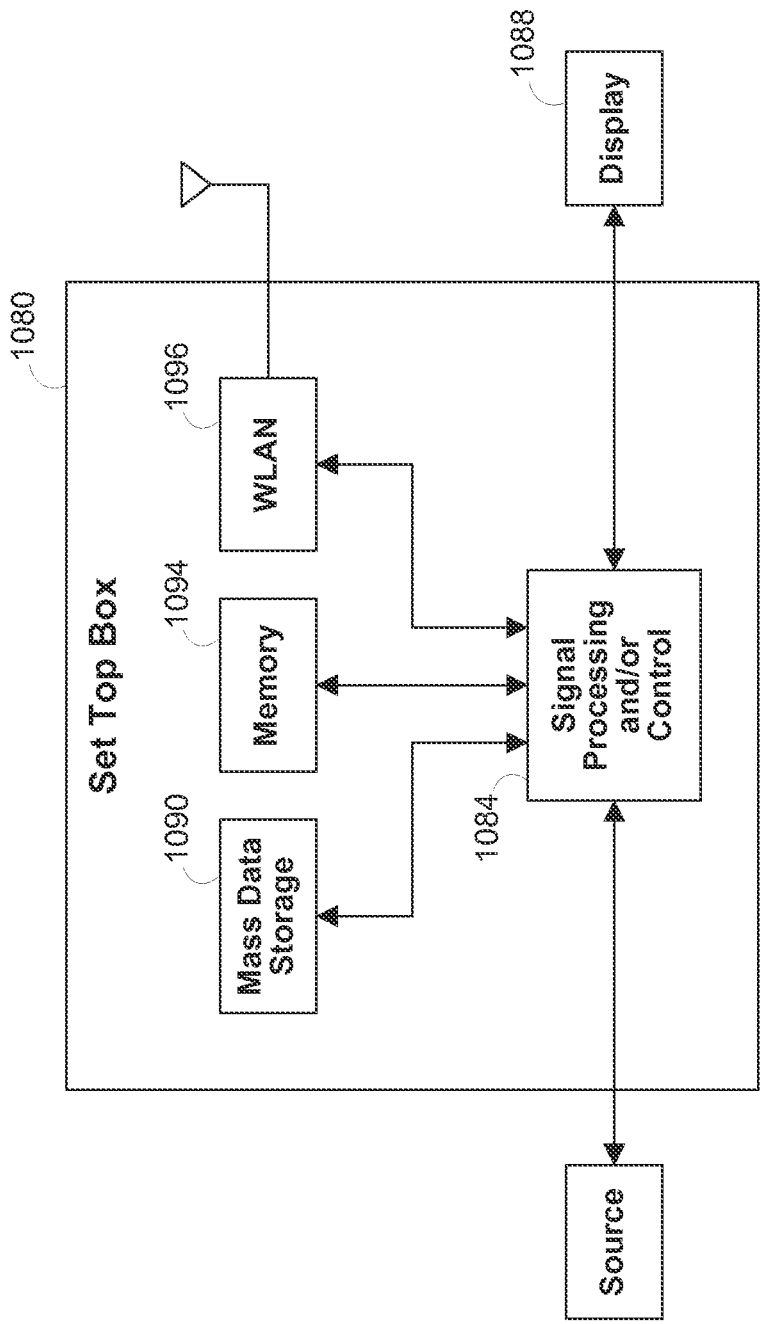
FIG. 6D is a block diagram of an exemplary set top box that can employ the disclosed technology.

Referring now to FIG. 6D, the present invention can be implemented in a set top box 1080. The present invention may implement either or both signal processing and/or control circuits, which are generally identified in FIG. 6D at 1084, a WLAN interface and/or mass data storage of the set top box 1080. The set top box 1080 receives signals from a source such as a broadband source and outputs standard and/or high definition audio/video signals suitable for a display 1088 such as a television and/or monitor and/or other video and/or audio output devices. The signal processing and/or control circuits 1084 and/or other circuits (not shown) of the set top box 1080 may process data, perform coding and/or encryption, perform calculations, format data and/or perform any other set top box function.

The set top box 1080 may communicate with mass data storage 1090 that stores data in a nonvolatile manner. The mass data storage 1090 may include optical and/or magnetic storage devices for example hard disk drives HDD and/or DVDs. The HDD may be a mini HDD that includes one or more platters having a diameter that is smaller than approximately 1.8". The set top box 1080 may be connected to memory 1094 such as RAM, ROM, low latency nonvolatile memory such as flash memory and/or other suitable electronic data storage. The set top box 1080 also may support connections with a WLAN via a WLAN network interface 1096.

Figure 6E:
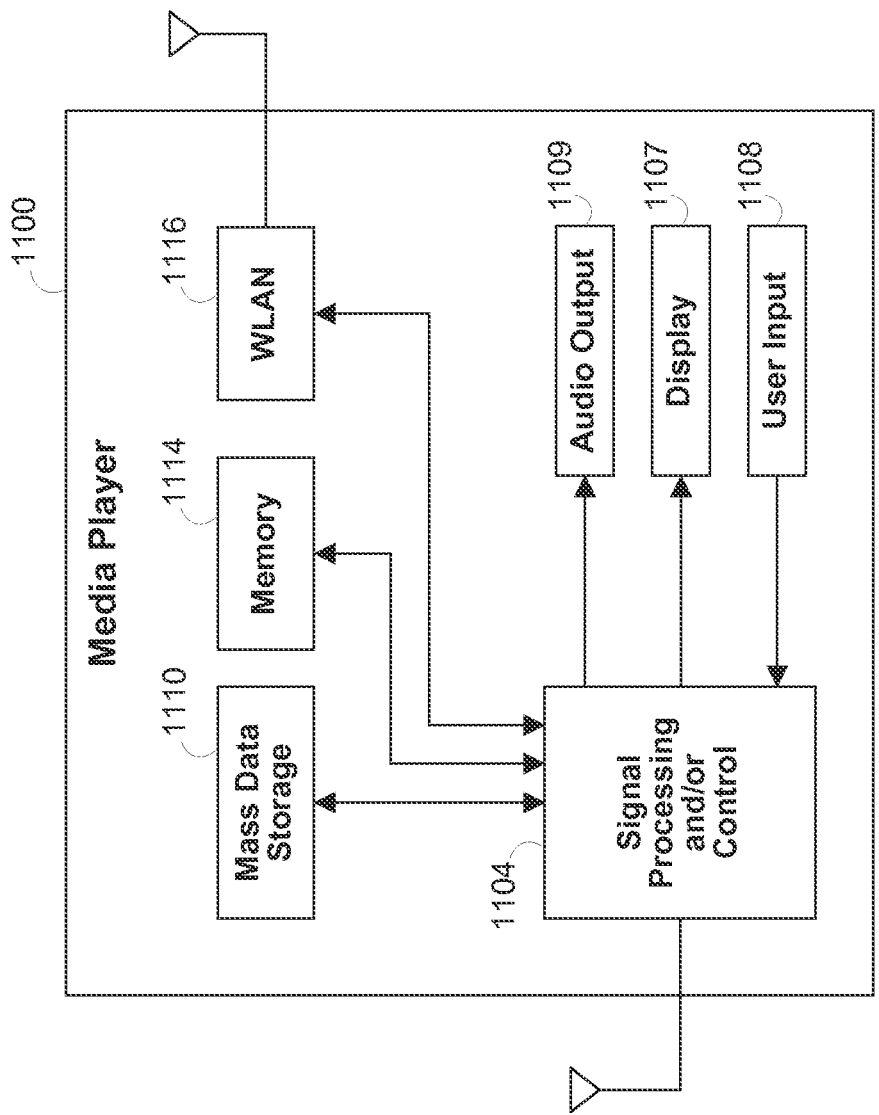
FIG. 6E is a block diagram of an exemplary media player that can employ the disclosed technology.

Referring now to FIG. 6E, the present invention can be implemented in a media player 1100. The present invention may implement either or both signal processing and/or control circuits, which are generally identified in FIG. 6E at 1104, a WLAN interface and/or mass data storage of the media player 1100. In some implementations, the media player 1100 includes a display 1107 and/or a user input 1108 such as a keypad, touchpad and the like. In some implementations, the media player 1100 may employ a graphical user interface (GUI) that typically employs menus, drop down menus, icons and/or a point-and-click interface via the display 1107 and/or user input 1108. The media player 1100 further includes an audio output 1109 such as a speaker and/or audio output jack. The signal processing and/or control circuits 1104 and/or other circuits (not shown) of the media player 1100 may process data, perform coding and/or encryption, perform calculations, format data and/or perform any other media player function.

The media player 1100 may communicate with mass data storage 1110 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 1100 may be connected to memory 1114 such as RAM, ROM, low latency nonvolatile memory such as flash memory and/or other suitable electronic data storage. The media player 1100 also may support connections with a WLAN via a WLAN network interface 1116. Still other implementations in addition to those described above are contemplated.

Accordingly, what have been described herein are a method and apparatus for estimating the frequency response of a FDM channel. The disclosed methods, components, and circuits can be implemented using various analog and/or digital circuit means, including circuitry made from various types, sizes, and/or configurations of transistors, MOS transistors, field effect transistors, BJTs, diodes, resistors, capacitors, inductors, integrated circuits, operation amplifiers, operational transconductance amplifiers, comparators, registers, latches, and/or current sources. The disclosed methods and systems can also be implemented using a processor architecture having machine readable instructions. The disclosed embodiments and illustrations are exemplary and do not limit the scope of the disclosed invention as defined by the following claims.

What is claimed is:

1. A method for estimating a frequency response of a channel, the method comprising:
   adjusting phase components of estimates of the frequency response to provide phase-adjusted estimates;
   filtering the phase-adjusted estimates to provide filtered phase-adjusted estimates of the frequency response of the channel; and
   reversing the phase adjustment of at least one of the adjusted phase components, wherein the reversing of the phase adjustment is performed on the filtered phase-adjusted estimates of the frequency response of the channel.

2. The method of claim 1, wherein adjusting the phase components of the estimates comprises:
   for each of at least one of sub-channels of the channel, computing a phase difference between a phase component of an estimate for the sub-channel and a phase component of an estimate for an adjacent sub-channel;
   computing a mean phase difference based on the phase differences; and
   adjusting the phase components of the estimates based on the mean phase difference to provide the phase-adjusted estimates.

3. The method of claim 2, wherein the sub-channels include at least a first sub-channel and a second sub-channel, and wherein adjusting the phase components of the estimates based on the mean phase difference comprises:
   adjusting the phase component of the estimate for the first sub-channel by a first multiple of the mean phase difference; and
   adjusting the phase component of the estimate for the second sub-channel by a second multiple of the mean phase difference.

4. The method of claim 3, wherein the first sub-channel corresponds to a first frequency value and the second sub-channel corresponds to a second frequency value, and wherein:
   the first multiple is greater than the second multiple if the first frequency value is greater than the second frequency value; and
   the first multiple is less than the second multiple if the first frequency value is less than the second frequency value.

5. The method of claim 3, wherein the first multiple differs from the second multiple by an amount that is proportional to a difference between the first and second frequency values.

6. The method of claim 2, wherein the reversing comprises:
   for each sub-channel, adjusting a phase component of the filtered phase-adjusted estimate by an amount that is substantially opposite of an amount of phase adjusting of the estimate for the sub-channel.

7. The method of claim 1, wherein filtering the phase-adjusted estimates comprises:
   for each of sub-channels of the channel, computing the filtered phase-adjusted estimate for the sub-channel based on the phase-adjusted estimate for the sub-channel and at least the phase-adjusted estimate for an adjacent sub-channel.

8. The method of claim 7, wherein computing the filtered phase-adjusted estimate for the sub-channel comprises computing an average of the phase-adjusted estimate for the sub-channel and the phase-adjusted estimates for a particular number of neighboring sub-channels.

9. The method of claim 1, further comprising:
   accessing an indicator that has an on-value and at least one other value; and
   performing said adjusting, said filtering, and said reversing only when the indicator has the on-value.

10. The method of claim 1, further comprising computing the estimates of the frequency response of sub-channels of the channel based on a received signal.

11. An apparatus for estimating a frequency response of a channel, the apparatus comprising:
    a phase adjustment circuit for adjusting phase components of estimates of the frequency response to provide phase-adjusted estimates;
    a filtering circuit for performing a filtering operation on the phase-adjusted estimates to provide filtered phase-adjusted estimates of the frequency response of the channel; and
    a reverse phase adjustment circuit for reversing the adjustment of at least one of the adjusted phase components in the filtered phase-adjusted estimates of the frequency response of the channel.

12. The apparatus of claim 11, wherein the phase adjustment circuit comprises:
    a phase difference circuit for computing, for each of at least one of sub-channels of the channel, a phase difference between a phase component of an estimate for the sub-channel and a phase component of an estimate for an adjacent sub-channel;
    an averaging circuit for computing a mean phase difference based on the phase differences; and an adjustment circuit for adjusting the phase components of the estimates based on the mean phase difference to provide the phase-adjusted estimates.

13. The apparatus of claim 12, wherein the sub-channels include at least a first sub-channel and a second sub-channel, and wherein the adjustment circuit comprises:
    circuitry for adjusting the phase component of the estimate for the first sub-channel by a first multiple of the mean phase difference; and
    circuitry for adjusting the phase component of the estimate for the second sub-channel by a second multiple of the mean phase difference.

14. The apparatus of claim 13, wherein the first sub-channel corresponds to a first frequency value and the second sub-channel corresponds to a second frequency value, and wherein:
    the first multiple is greater than the second multiple if the first frequency value is greater than the second frequency value, and
    the first multiple is less than the second multiple if the first frequency value is less than the second frequency value.

15. The apparatus of claim 13, wherein the first multiple differs from the second multiple by an amount that is proportional to a difference between the first and second frequency values.

16. The apparatus of claim 12, wherein the reverse phase adjustment circuit adjusts, for each sub-channel, a phase component of the filtered phase-adjusted estimate by an amount that is substantially opposite of an amount of phase adjusting of the estimate for the sub-channel.

17. The apparatus of claim 11, wherein the filtering circuit computes, for each of sub-channels of the channel, the filtered phase-adjusted estimate for the sub-channel based on the phase-adjusted estimate for the sub-channel and at least the phase-adjusted estimate for an adjacent sub-channel.

18. The apparatus of claim 11, further comprising:
    a memory for storing an indicator that has an on-value and at least one other value; and
    a control circuit for enabling the phase adjustment circuit, the filtering circuit, and the reverse phase adjustment circuit only when the indicator has the on-value.

19. A method for estimating a frequency response of a channel, the method comprising:
    compensating phase components of estimates of the frequency response by removing a corresponding phase roll from at least one of the phase components to provide phase-adjusted estimates of the frequency response of the channel;
    performing a filtering operation on the phase-adjusted estimates to provide filtered phase-adjusted estimates of the frequency response; and
    re-introducing the respective phase roll to the at least one of the phase components in the filtered phase-adjusted estimates of the frequency response.

20. The method of claim 19, wherein the filtering operation comprises:
    for each of sub-channels of the channel, computing the filtered phase-adjusted estimate for the sub-channel based on the phase-adjusted estimate for the sub-channel and at least the phase-adjusted estimate for an adjacent sub-channel.

* * * * *